United States Patent

Tahara et al.

[11] 4,039,443
[45] Aug. 2, 1977

[54] CONDENSATE PURIFICATION PROCESS

[75] Inventors: Sentaroo Tahara, Tokyo; Toshiteru Murata, Kawashi; Seiki Shimaya, Tokyo, all of Japan; George J. Crits, Havertown, Pa.

[73] Assignee: Crane Co., New York, N.Y.

[21] Appl. No.: 693,841

[22] Filed: June 8, 1976

Related U.S. Application Data

[63] Continuation of Ser. No. 641,935, Dec. 18, 1975, abandoned.

[30] Foreign Application Priority Data

Dec. 18, 1974 Japan .................. 49-145178

[51] Int. Cl.$^2$ .................. B01D 15/06; C02B 1/70
[52] U.S. Cl. .................. 210/32; 210/34
[58] Field of Search .................. 210/30 R, 32, 33, 34, 210/37 R, 37 A, 38 R, 38 A, 38 B, 38 C

[56] References Cited

U.S. PATENT DOCUMENTS

3,583,908  6/1971  Crits .................. 210/32
3,939,071  2/1976  Katzakian et al. .................. 210/34

OTHER PUBLICATIONS

Chemical Abstracts, vol. 57, No. 12266(g), 1962.

*Primary Examiner*—Wilbur L. Bascomb, Jr.
*Assistant Examiner*—Ivars Cintins
*Attorney, Agent, or Firm*—Edward H. Mazer; George S. Schwind; George A. Smith, Jr.

[57] ABSTRACT

A method of treatment of condensate water by a mixed bed of ion exchange resins, the method being characterized by the following procedure; in regenerating the charged resins, after passing the condensate water through the mixed bed of ion exchange resins, the mixed bed is separated into a layer of anion exchange resin and a layer of cation exchange resin; the anion exchange resin layer is regenerated by caustic soda and is then treated with an aqueous solution of hydrazine. After the treatment, the aqueous solution of hydrazine is purified by passing it through a bed of hydrazine type cation exchange resin. Then, the purified aqueous solution of hydrazine is reused in the treatment of the layer of anion exchange resin.

10 Claims, 1 Drawing Figure

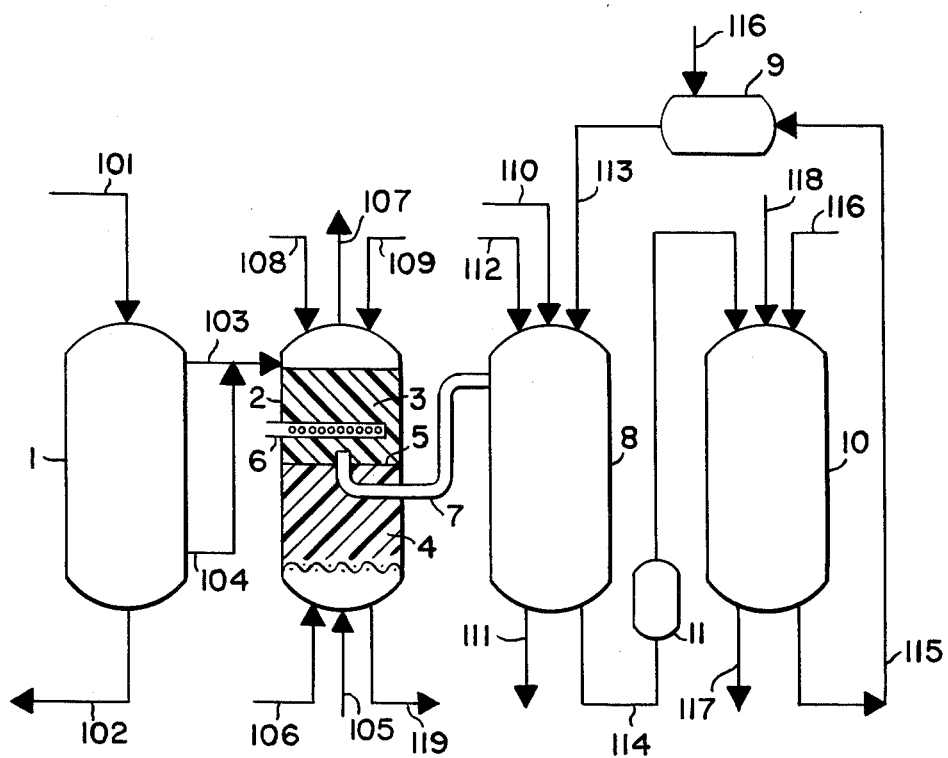

CONDENSATE PURIFICATION PROCESS

CROSS-REFERENCE TO RELATED APPLICATION

This is a continuation of our co-pending application Ser. No. 641,935, filed on Dec. 18, 1975, now abandoned.

BRIEF SUMMARY OF THE INVENTION

This invention relates to a method of purifying condensate water and specifically to a method of using hydrazine in the regeneration of ion exchange resins, after the ion exchange treatment of condensate water by use of a mixed bed of ion exchange resins. The invention is especially suitable for application to steam turbine power systems including large scale electric power generation systems.

The most widely used condensate water treatment method involves the use of a mixed bed of cation exchange resin in the hydrogen form and anion exchange resin in the hydroxyl form. In the process of regenerating the cation exchange resin and anion exchange resin used in this method, the two resins are separated into layers. The separation of strongly acidic cation exchange resin from anion exchange resin is ordinarily done by reverse water washing, and because of the difference of specific gravity between the two resins, the anion exchange resin separates into the upper layer and the cation exchange resin separates into the lower layer. Unfortunately, separation by this method is never perfect, and there is always an amount of cation exchange resin contained in the layer of anion exchange resin. The boundary between the two layers is also frequently uneven. Also, the position of the boundary changes from cycle to cycle depending on the operating conditions. The unevenness of the boundary and the changes in its position are caused by imperfections in grade separation, and wear and tear of the cation exchange resin. For these reasons it is practically impossible to completely prevent the anion exchange resin from being contaminated by the cation exchange resin.

Regeneration of the resins is carried out either in the same vessel, with the resins separated into two layers, or with one of the two resins transferred to a separate regeneration zone; at this time, the anion exchange resin is regenerated by passing sodium hydroxide through the resin layer, and the cation exchange resin which contaminated said layer would be converted to the sodium form. When the anion exchange resin which was regenerated is again mixed with the regenerated cation exchange resin layer and the mixture is again used for treatment of condensate, impurities in the condensate cause the sodium component from the cation exchange resin which was converted to the sodium form, to leak into the condensate water. This phenomenon, known as "sodium leakage" can cause damage to a steam turbine power system.

Furthermore, the impurities in the condensate water which were absorbed by the anion exchange resin layer, especially the iron components, cannot be desorbed by the regeneration with caustic soda alone. And as the cycle of passing water is repeated, the impurities accumulate in the anion exchange resin, gradually reducing its ion exchange capacity.

Recently, in order to reduce sodium leakage, a method has been proposed in which, following separation of the resin layers and regeneration of the anion exchange resin layer with caustic soda and the cation exchange resin layer with acid, the anion exchange resin layer is treated with ammonia water and the cation exchange resin layer is ammoniated. This has the effect of converting the sodium type cation exchange resin contaminating the anion exchange resin into an ammonium type. However, the method has little effect on the accumulation of iron and other impurities in the anion exchange resin.

This invention is the result of work directed towards perfecting a method of purifying condensate water, which overcomes all of the above mentioned difficulties related to the anion exchange resin layer which is used in the mixed bed. We have discovered that all of the above mentioned difficulties can be solved by treating the anion exchange resin layer with hydrazine after it is regenerated with caustic soda and that, when this hydrazine treatment is carried out by a specific method, consumption of hydrazine can be limited to a minimum, thus providing an industrially advantageous regeneration system.

The main object of this invention is to provide a method of ion exchange treatment of condensate water which is safe, efficient and, moreover, industrially advantageous. In accordance with the invention this object is achieved by the following procedure. In regenerating the charged resin after passing condensate water through the mixed bed of ion exchange resins, the mixed bed is separated into a layer of anion exchange resin and a layer of cation exchange resin. After the anion exchange resin layer is regenerated with caustic soda, it is treated with an aqueous solution of hydrazine. The aqueous solution of hydrazine, after said treatment, is purified by passing the liquid through a bed of hydrazine type cation exchange resin. The purified aqueous solution of hydrazine is reused in the treatment of the anion exchange resin layer.

BRIEF DESCRIPTION OF THE DRAWING

The single FIGURE is a schematic diagram of a preferred apparatus used in carrying out the method of this invention.

In the FIGURE, 1 is a mixed bed type exchanger, 2 is a separator-regenerator, 3 is a layer of anion exchange resin, 4 is a layer of cation exchange resin, 5 is the boundary surface between the two resin layers, 6 is a collecting and distributing pipe, 7 is a resin transfer pipe, 8 is an anion exchange resin regenerator, 9 is a hydrazine storage tank, 10 is a hydrazine purification tank, 11 is a buffer storage tank and 101 – 119 indicate various connecting pipes.

DETAILED DESCRIPTION

Although the drawing shows a single mixed bed type ion exchange, a number of mixed bed type exchangers can be used in parallel. When the exchange capability decreases, the exchangers are taken from the condensate water treatment system in sequence and are subjected to the regeneration process. When this invention is applied to a typical steam turbine power system, the condensate water which was treated by an exchanger is fed into the boiler through a heat exchanger; the water becomes steam and is sent to the turbine and then is exhausted to the condenser. Then, together with the new supply of water, which is provided as needed, it is fed into the exchanger.

Inlet and outlet of the condensate water, which are needed in the operation of the exchanger 1 for the condensate water purification, are indicated by pipes 101 and 102. When the exchange capacity of the resin decreases to a point where it requires regeneration, the flow of condensate water is stopped and the resin is sent to the separator-regenerator 2 through pipe 103 or 104.

Granules of the resin thus transferred are separated, and then the resin is back-washed in order to remove the solid which came into being in the resin as a result of the filtration effect of the resin.

Back-washing is carried out by causing water to flow in the upward direction under a suitable rate, and also by introducing gas, such as air, interchangeably or simultaneously with the water. The inlets for water and gas are indicated respectively by pipes 105 and 106. An outflow pipe for both water and gas is indicated at 107.

When the solid components, such as metallic oxides, are removed, the flow of water into the exchanger is stopped or adjusted. Then, following the ordinary method, the two resins are separated into two layers 3 and 4. As the specific gravity of the anion exchange resin is smaller, the layer of anion exchange resin 3 forms in the upper part of separator-regenerator 2 and the layer of cation exchange resin 4 forms in the lower part of the separator-regenerator.

Next, each of the resins is regenerated; the process is preferably carried out separately by transferring the anion exchange resin into a separate regenerator. In this case, an opening of the resin transfer tube 7 is installed at a suitable distance above the boundary surface 5 of the two resins, and by the transfer water which is fed from pipe 108, the anion exchange resin is transferred into the anion exchange resin regenerator 8 through the resin transfer tube 7. In regenerator 8, the anion exchange resin is regenerated by the aqueous solution of caustic soda which is taken in from pipe 110 and exhausted through pipe 111. The anion exchange resin is also washed with water which is taken in through pipe 112 and exhausted through pipe 111.

Even if the two resins are separated into two layers very carefully, and a suitable distance is provided between the opening of the resin transfer tube 7 and the boundary surface 5 between the two resin layers, to provide a barrier of the anion exchange resin, it is still practically impossible to avoid completely the presence of cation exchange resin in the layer of anion exchange resin. This is explained by the fact that even with resin granules of standard size, it is difficult to accomplish a perfect layer separation. To make things worse, the cation exchange resin granules break into finer particles during the continuous operation, and these small particles settle at approximately the same speed as that of standard sized anion exchange resin granules. Consequently, contamination occurs, such that a percentage of sodium type cation exchange resin is found mixed in the anion exchange resin layer which was regenerated by caustic soda. Then, when the regenerated resins are mixed and used in the purification treatment of condensate water, there arises the problem of sodium leakage in the initial period of operation.

In this invention, after regeneration and washing, the anion exchange resin which contains a small amount of sodium type cation exchange resin is treated with hydrazine, and when the following method is chosen for the treatment, consumption of hydrazine can be kept at a minimum amount while achieving effective treatment.

From the storage tank 9 for the aqueous solution of hydrazine, the hydrazine solution is contacted, via pipe 113, with the anion exchange resin layer which contains a small amount of sodium type cation exchange resin. By this contact, the aqueous solution of hydrazine comes to contain a small amount of sodium ions. The hydrazine solution, along with these sodium ions, is taken out by pipe 114 and is sent to hydrazine purification tank 10 which is filled with a hydrazine type cation exchange resin. In the tank 10, the sodium ions which accompanied the hydrazine are trapped by the cation exchange resin, and the corresponding amount of hydrazine separates out from the hydrazine-type cation exchange resin and flows into the aqueous solution. Thus, the aqueous solution of hydrazine which passes through the hydrazine purification tank and is removed through pipe 115 is of the same quality as that of the solution which is fed from pipe 113. It can be used, without any further purification, again for the hydrazine treatment of the anion exchange resin layer. The purified aqueous solution is preferably returned to the storage tank 9 through pipe 115, and hydrazine is also fed into the storage tank 9 by pipe 116 to make up the natural loss. Operation of the hydrazine purification tank 10 is regulated by setting a value for the maximum permissible concentration of sodium ions in the purified aqueous solution of hydrazine which is removed from tank 10 through pipe 115. When the concentration of sodium ions exceeds the set value or is immediately under that value, the operation is stopped, and the cation exchange resin in the purification tank 10 is regenerated by acid fed through pipe 116 and removed through pipe 117. Then, the cation resin in tank 10 is washed, and is converted back to the hydrazine form by use of an aqueous solution of hydrazine which is fed through pipe 118. After this, tank 10 is placed back into use. When the period in which the purification process in purification tank 10 is stopped, overlaps with the period in which the hydrazine treatment operation in the regenerator 8 is occurring, for example, a buffer storage tank 11 can be installed in the middle of pipe 114 to store the aqueous solution of hydrazine temporarily after treatment of the anion resin, and the fresh hydrazine solution can be continuously fed from the hydrazine storage tank 9; in this way, even during the period in which the operation of the purification tank 10 is stopped, hydrazine treatment in the regenerator 8 can be favorably continued without interruption.

By this hydrazine treatment, the sodium type cation exchange resin which was contaminated in the anion exchange resin layer is converted to the hydrazine type, and the above mentioned problem of sodium leakage during the initial stage in the purification of condensate water is eliminated. The previously proposed method of using ammonia in place of this hydrazine treatment eliminates the above mentioned problem in a similar manner. However, the anion exchange resin gradually loses its ion exchange capacity because of contamination by iron components during repeated cycles of condensate water purification and regeneration. In this invention, however, the hydrazine treatment removes these iron components simultaneously, and thus has the advantage of achieving more perfect recovery of ion exchange capacity.

Furthermore, consumption of hydrazine can be limited to a minimum level by installing the hydrazine purification tank as mentioned above.

Also, it is possible to eliminate the hydrazine storage tank 9, if the purified hydrazine being returned by pipe 115 can be fed immediately into the same or other regenerator 8.

The layer of cation exchange resin which was left in the separator-regenerator is, of course, regenerated by an acidic regeneration agent (usually sulfuric acid is suitable for use) which is fed from pipe 109 and taken out by pipe 119. After this, it is washed by the ordinary method.

The FIGURE illustrates the method of regenerating the layer of anion exchange resin and the layer of cation exchange resin in separate vessels. But, the invention is not limited to this method. For example, collecting and distributing pipe 6, located at a suitable distance above the boundary surface between the two resin layers, can be used for the introduction of regeneration agent and hydrazine so that the two resin layers can be regenerated in the same vessel. In this case, the resin transfer tube 7 and the regenerator 8 are eliminated and suitable piping is provided for introduction and removal of water, regenerants and hydrazine.

In accordance with the invention, the anion exchange resin is regenerated into the hydroxyl form, the contaminated cation exchange resin is regenerated into the hydrazine form, and the main cation exchange resin is regenerated into the hydrogen form. Each of these regenerated resins is washed thoroughly, and the resins are mixed (a tank for mixing can be installed if necessary) and returned to the mixed bed type exchanger 1 in which they are used for purification of condensate water. Thus, in accordance with the method of this invention, a major part of the cation exchange resin contributes to the purification of condensate water in the hydrogen form. But the condensate water contains a large amount of ammonium ions used for pH adjustment, and as the flow of liquid continues, the resin converts gradually to the ammonium form, except for the portion which trapped the metallic ions of the impurities. Even after the layer of cation exchange resin is saturated with ammonium ions, it still has the ability to trap various metallic ions, including sodium ions. Therefore, although the operation can be stopped either before or at the time ammonium ions begin to leak from the mixed bed, it can also be continued. In case it is continued, it is desirable to detect the leakage of sodium ions and use the result of such detection as the criterion for stopping the operation. Thus, in this invention, the cation exchange resin is used in the hydrogen form without modification for condensate water purification cycles, and when this is done, effective trapping of sodium ions is possible even when an unexpectedly large amount of sodium ions is introduced, as in the case of contamination by sea water. This makes the invention especially suitable for such cases. Although there are certain advantages to be gained from operation of the cation exchange resin in the hydrogen form, it is also possible to ammoniate the regenerated cation exchange resin layer before use in the condensate water purification cycle. Similarly the cation exchange resin can be hydrazinated if desired.

The hydrazine solution treatment of the anion exchange resin layer contaminated with the cation exchange resin previously described, can be done in various modes. A preferred method is to use an aqueous solution of a relatively low concentration at a relatively high flow rate. Ordinarily an aqueous solution of hydrazine of a concentration of 0.05 - 5 percent by weight, preferably of 0.1 - 1 percent by weight is passed at a flow rate of 1 - 50 $m^3$/hr, preferably of 5 - 20 $m^3$/hr.

As described above in detail, in the regeneration process of this invention, the danger of leakage of sodium ions during the initial period, from the cation exchange resin contained in the anion exchange resin layer, is eliminated. At the same time, certain other advantages are obtained.

In particular, the hydrazine in the hydrazine type cation exchange resin seldom affects the pH control of the feed water. The hydrazine type cation exchange resin is ion-exchanged by other metallic ions in the water and, even if it should mix with the feed water, most of it will decompose into nitrogen and water by reacting with the dissolved oxygen contained in the feed water, when the temperature is above 200° C, having no effect on the pH of the feed water. At the same time, this helps more complete elimination of the dissolved oxygen contained in the condensate water.

Among the impurities contained in the condensate water, it is believed that the iron component is especially large, and the properties of the iron contained in the condensate water have been discussed extensively. In the mixed bed of ion exchange resins, a part of the iron components is absorbed to the cation exchange resin and a part of it is absorbed to the anion exchange resin. In this case, the iron components which are absorbed in the anion exchange resin can accumulate in the resin when the cycles of regenerating by use of caustic soda alone are repeated. This invention is characterized by use of hydrazine whose activity as a reducing agent is effectively utilized to easily remove the iron components adsorbed to the anion exchange resin. By this method, the ion exchange capacity of the anion exchange resin decreases less, and the treatment capacity of the device for desalting condensate water can be advantageously kept at a high efficiency at all times.

This invention can be applied to the ion exchange resins used in the devices for desalting condensate water which have been used in the past. And as for the resins used, any known kinds of resins can be used.

We claim:

1. In a water purification process involving flow of water through a demineralizer containing mixed anion exchange resin granules and cation exchange resin granules, the steps of separating the resins into two beds, one of which contains anion exchange resin granules entraining a minor amount of cation exchange resin granules and the other of which contains the major part of the cation exchange resin granules, regenerating the first-mentioned bed with alkali, and following the regeneration with alkali, recirculating an aqueous solution of hydrazine through said first-mentioned bed to effect displacement of alkali metal from the entrained cation exchange resin granules.

2. The process of claim 1 wherein the aqueous hydrazine solution, therefor is recirculated through said first-mentioned bed and an auxiliary bed of cation exchange resin, said beds being in series, whereby the alkali metal displaced from the entrained cation exchange resin granules is absorbed by the auxiliary bed.

3. The process of claim 2 in which the auxiliary bed is a bed of cation exchange resin in the hydrazine form.

4. The process of claim 1 wherein the aqueous hydrazine solution is recirculated through said first-mentioned bed and an auxiliary bed of cation exchange resin, said beds being in series, whereby the alkali metal displaced from the entrained cation exchange resin granules is absorbed by the auxiliary bed and wherein the auxiliary bed is regenerated with acid regenerant.

5. The process of claim 1 wherein the aqueous hydrazine solution is recirculated through said first-mentioned bed and an auxiliary bed of cation exchange resin, said beds being in series, whereby the alkali metal displaced from the entrained cation exchange resin granules is absorbed by the auxiliary bed and wherein the auxiliary bed is regenerated by treatment with acid regenerant followed by treatment with an aqueous solution of hydrazine to put the cation resin in the auxiliary bed in the hydrazine form.

6. The process of claim 1 wherein the aqueous hydrazine solution is recirculated through the first-mentioned bed and an auxiliary bed of cation exchange resin, said beds being in series, whereby the alkali metal displaced from the entrained cation exchange resin granules is absorbed by the auxiliary bed and wherein the auxiliary bed is regenerated with acid regenerant, and wherein, during at least part of the process aqueous hydrazine solution is continuously fed through said first-mentioned bed while operation of said auxiliary bed of cation exchange resin is stopped.

7. The process of claim 1 wherein the aqueous hydrazine solution recirculated through said first mentioned bed has a hydrazine concentration of approximately 0.05 to 5 per cent by weight.

8. The process of claim 7 wherein the aqueous hydrazine solution is recirculated through said first-mentioned bed at a flow rate of approximately 1–50m$^3$/hr.

9. The process of claim 7 wherein the hydrazine concentration is 0.1 to 1 per cent by weight.

10. The process of claim 9 wherein the aqueous hydrazine solution is recirculated through said first-mentioned bed at a flow rate of approximately 5–20m$^3$/hr.

* * * * *